United States Patent
DeRosa

Patent Number: 6,097,164
Date of Patent: Aug. 1, 2000

[54] ON BOARD POWER REGENERATION SYSTEM FOR ELECTRICALLY OPERATED VEHICLES

[76] Inventor: Glenn P. DeRosa, 9 Hawthorne Rd., Milton, Mass. 02186

[21] Appl. No.: 08/794,948

[22] Filed: Feb. 4, 1997

[51] Int. Cl.[7] .................................................. H02P 1/00
[52] U.S. Cl. ........................... 318/139; 318/150; 290/16; 290/40 C; 322/16; 322/4
[58] Field of Search ............................. 318/89, 140–158; 290/8–29, 39, 40 C; 322/16, 4

[56] References Cited

U.S. PATENT DOCUMENTS

| | | |
|---|---|---|
| 3,499,164 | 3/1970 | Frerre et al. . |
| 4,597,463 | 7/1986 | Barnard ................................. 180/165 |
| 5,343,970 | 9/1994 | Severinsky ............................ 180/65.2 |
| 5,384,521 | 1/1995 | Coe ......................................... 318/161 |
| 5,568,023 | 10/1996 | Grayer et al. ............................ 318/139 |
| 5,589,743 | 12/1996 | King ........................................ 318/139 |
| 5,678,647 | 10/1997 | Wolfe et al. ............................ 180/65.3 |

*Primary Examiner*—David Martin
*Attorney, Agent, or Firm*—John M. Brandt

[57] ABSTRACT

An on-board electrical powered regeneration system for vehicles propelled by an electric traction motor and having an electrical storage cell bank composed of a rotatable flywheel operatively connected to an impeller, a fuel combustor arranged to emit a stream of gas directed to impinge on the impeller, a supply of fuel for the combustor, a generator driven by the flywheel, and electric power control means connected between the generator and the cell bank to convert the electrical output of the generator to a form compatible with the cell bank. Use of the flywheel as a power retainer and booster is also disclosed.

6 Claims, 3 Drawing Sheets

ON BOARD POWER REGENERATION SYSTEM FOR ELECTRICALLY OPERATED VEHICLES

BACKGROUND OF THE INVENTION

Field of the Invention: The invention relates to electrically powered vehicles and more particularly relates to vehicles including a self contained electrical power regeneration system.

DESCRIPTION OF THE PRIOR ACT

Electrically powered vehicles are well known in the prior act. An efficient easily rechargeable or refuelable vehicle having a substantial range of travel remains a much sought after goal in an era where air pollution from combustion engines is a continually increasing problem.

The basic electric vehicle consists of an electrically powered traction motor and a battery storage unit which when discharged must be regenerated at a fixed location over a period of time. There are also a class of vehicles known as hybrids which in addition to an electric motor employ an internal combustion engine to drive a generator and may or may not include a prime mover storage battery.

Examples of these are U.S. Pat. No. 3,499,164 G E Ferre et al, ad U.S. Pat. No. 5,461,289, Ader et al; British Patent 1,509,497, Rao and Australian patent 136,620, Vickers Co, without storage batteries; and U.S. Pat. No. 3,515,766, West, and U.S. Pat. No. 5,141,173, Lay, with storage batteries.

Additionally the concept of a gas turbine or impeller driving a generator which in turn supplies power to an electrically powered motor is disclosed in British Patent 14,166, Ransford, and, U.S. Pat. No. 5,432,383, Kawamura. Neither include a storage battery to supply power to the motor when the turbine is not operating.

Further, U.S. Pat. No. 4,309,620 Bock, reveals an electric transmission utilizing a flywheel which is electrically integrated in a system in which the prime mover is an internal combustion engine.

The invention described herein presents an improvement in the prior act devices known to the inventor. Specifically, it presents an on-board electrical regeneration system which frees the vehicle from the limitations of range inherent in battery power supplies which require recharging at a stationary location for a substantial period. At the same time, it eliminates the use of an internal combustion engine which is prevalent as primary or secondary in the prior act heretofore described.

SUMMARY OF THE INVENTION

The invention may be summarized as an electrically powered vehicle having electrical storage means, typically a rechargeable battery cell bank, which vehicle additionally includes a generator operated by a rotatable flywheel. The flywheel is energized at least in part by a fuel combustor which is arranged to emit a stream of gas to rotate the flywheel by a plurality of appropriately positioned paddles, blades or deflectors essentially forming a turbine or impeller.

In comparison to vehicles found in the prior act, the addition of an electrical regeneration system frees this method of transportation from the range limitations inherent in exhaustible storage batteries while preserving electrical energy as the prime mover power source.

By using a fuel combustor that, in the preferred embodiment, is essentially a rocket motor to produce the power needed for regeneration, the complexity and inefficiency of the internal combustion engine are eliminated.

The invention further contemplates the use of a flywheel which is arranged to be rotated of the thrust of the gas emission of the combustor by the inclusion of a device constituting a turbine or impeller. This may consist of, for example, a plurality of gas receiving paddles positioned about the periphery of the wheel or a similar arrangement located at or in the flywheel axis.

The invention particularly lends itself to the use of pollution free alternative fuels. For example, a hydrogen peroxide/water solution may be burned by passing a stream of the solution under pressure through a catalytic screen to produce the necessary thrust to rotate the flywheel. The combustion by products of this process are oxygen and water vapor.

Finally, the momentum of the flywheel may be tapped to provide extra power for acceleration or steep grade ascension. Further, the flywheel rotation may be augmented during braking by transferring some of the vehicle momentum through the drive train to the flywheel by an appropriate clutch mechanism. These and other features and advantages of the invention will be more fully understood from the description of the preferred embodiment and drawings which follow.

DESCRIPTION OF THE PREFERRED EMBODIMENT

Figure 1:
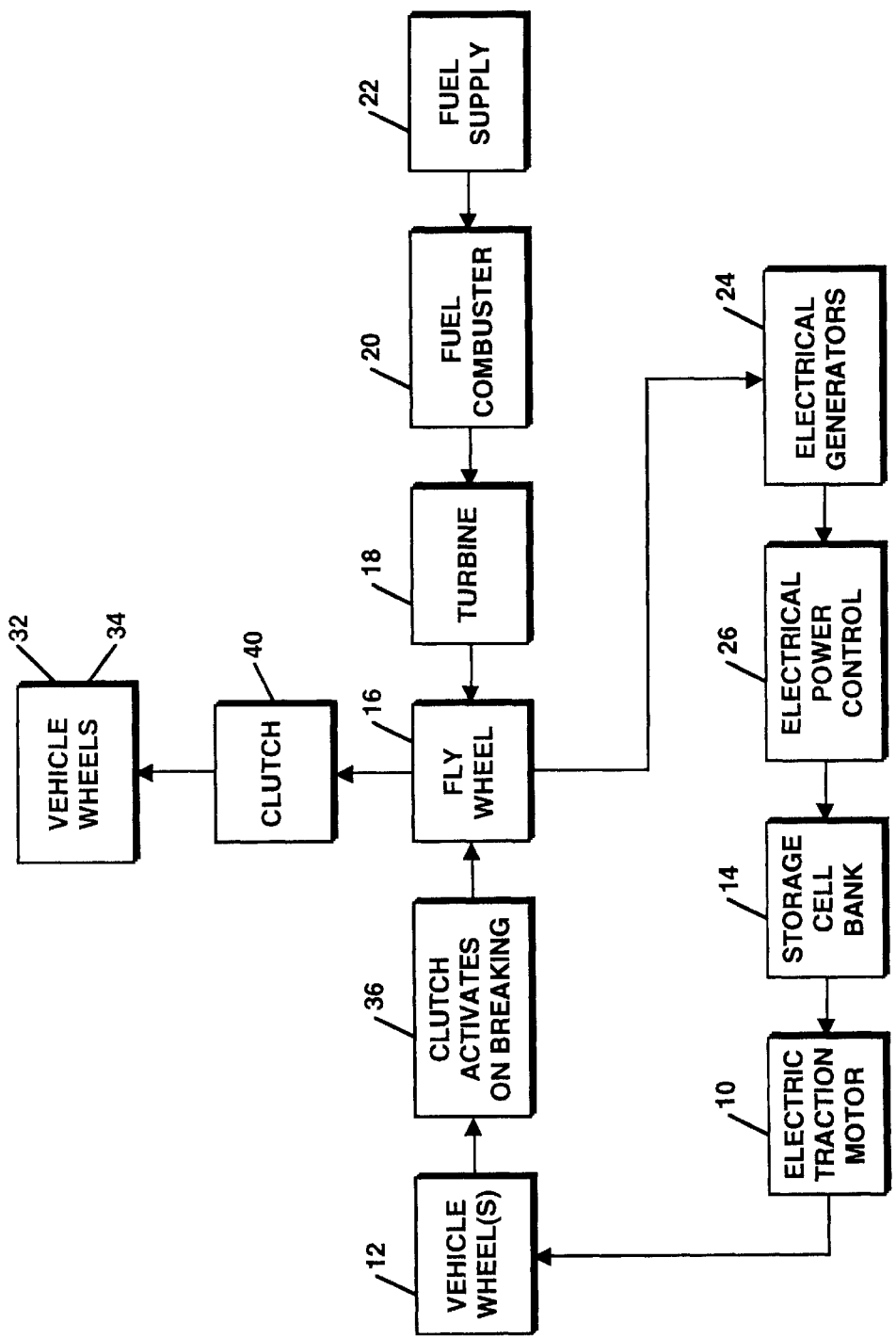
FIG. 1 is a schematic block diagram of the preferred embodiment of the invention.

Referring first to FIG. 1 there is shown a block diagram comprising the elements of the preferred embodiment of the invention. Electric traction motor 10 is arranged to drive one or more vehicle wheels 12 and is powered by rechargeable storage cell block 14. Flywheel 16 normally mounted at the rear of the vehicle as will be shown below is operatively connected to impeller or turbine 18 which receives an impulse stream of gas emitted by fuel combustor 20 fueled by fuel supply 22.

Flywheel 16 is operatively connected to electrical generator 24 which upon rotation of the flywheel revolves to generate electrical power which after passing through electrical power control 26 recharges storage cell block 14.

Control 26 consisting of an appropriate array of resistors and capacitors and/or an AC/DC converter to store energy for a short term and regulate power fluctuations caused by the speeding up and slowing down of the flywheel and generator.

Figure 2:
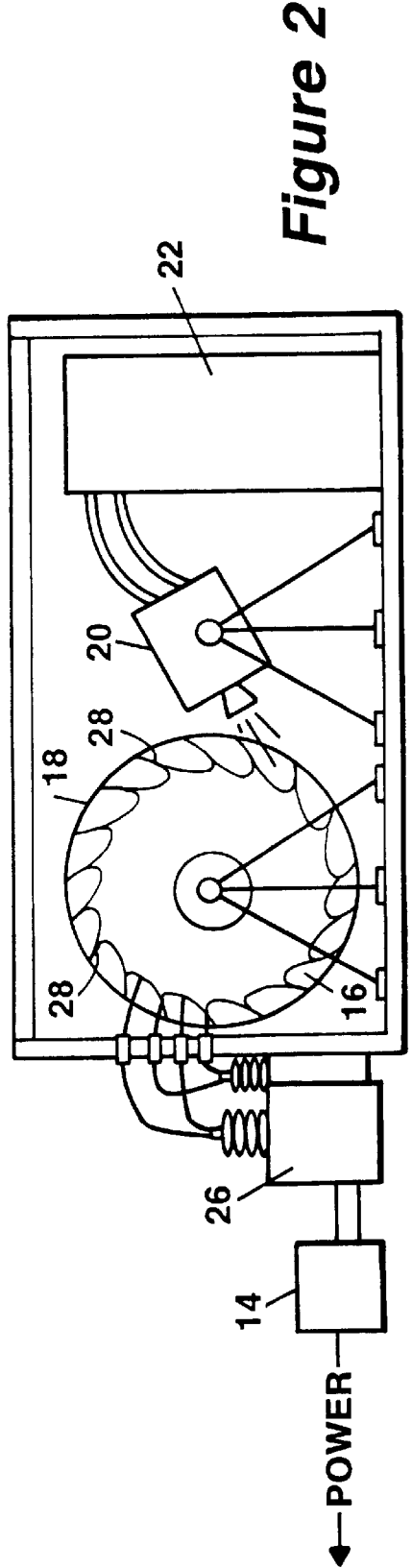
FIG. 2 is a side view of a schematic illustration of the preferred embodiment of the invention.
Figure 3:
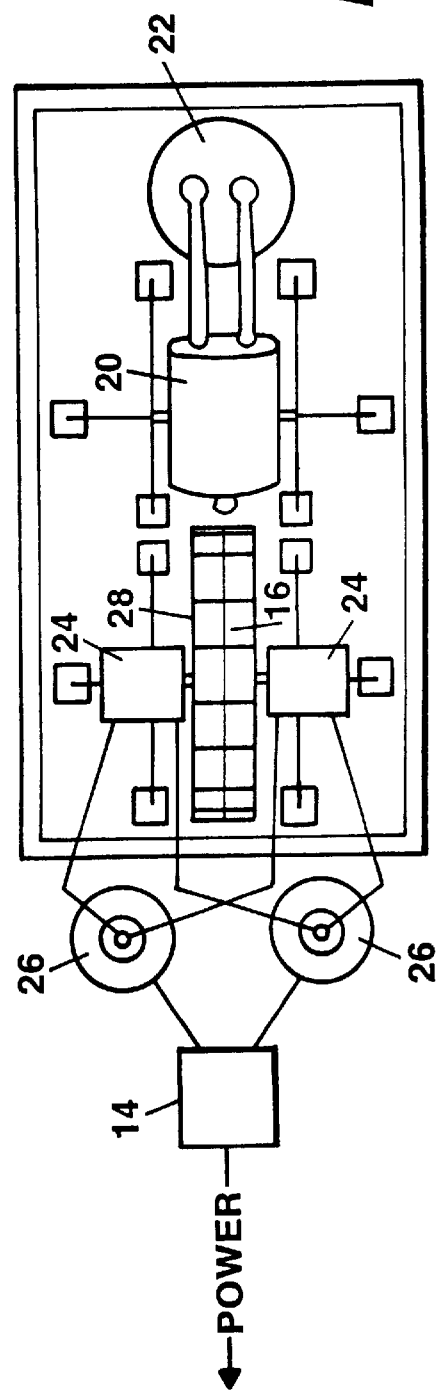
FIG. 3 is a top view of the embodiment of FIG. 2.

Referring to FIGS. 2 and 3 schematic diagrams showing a side and top view of a portion of FIG. 1 are shown where like numbers refer to like components. In this embodiment the impeller consist of a plurality of paddle extensions 28 mounted about the circumference of flywheel 16. Fuel combustor 20 may comprise for example, of an Arvil Porter type rocket motor which receives fuel in the form of hydrogen peroxide, for example, under pressure from fuel supply 22 and utilizes an appropriate catalyst to initiate the burning and expansion of the fuel. It will be appreciated that other fuels and burning systems may be employed as long as they emit a stream of gas on combustion vehicle which will drive flywheel 16.

Figure 4:
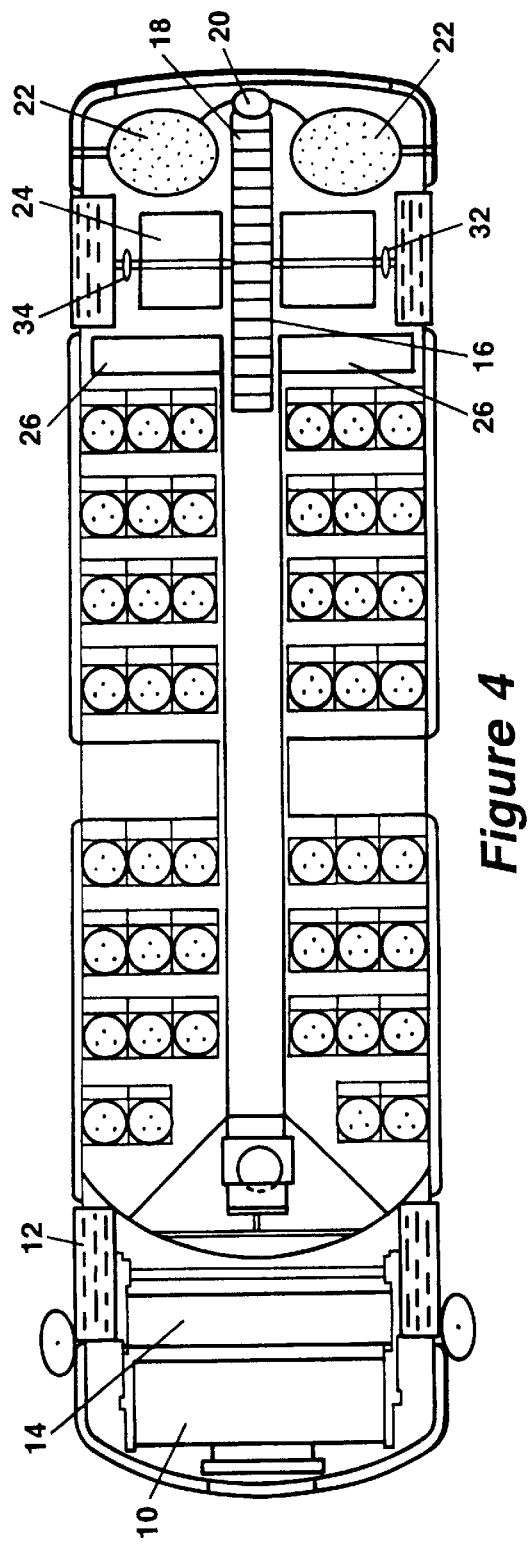
FIG. 4 is a top view of a vehicle incorporating the apparatus of the invention.

Referring next to FIG. 4, the installation of the invention in a multipassenger bus 30 is shown. Again like numbers refer to like components. As illustrated, flywheel 16 turbine or impeller 18, combustor 20, fuel supply 22, generator 24, and control 26 are all mounted at the rear of the vehicle providing the additional advantage of adding desired weight to rear wheels 32 and 34.

It is also contemplated that vehicles such as that illustrated in FIG. 4 may take advantage of the momentum contained in the power system to increase the rotation of the flywheel upon braking. This may be accomplished by the use of clutch 36 shown in FIG. 1 which can be activated by a conventional braking pedal which will operate hydraulic brakes.

Figure 5:
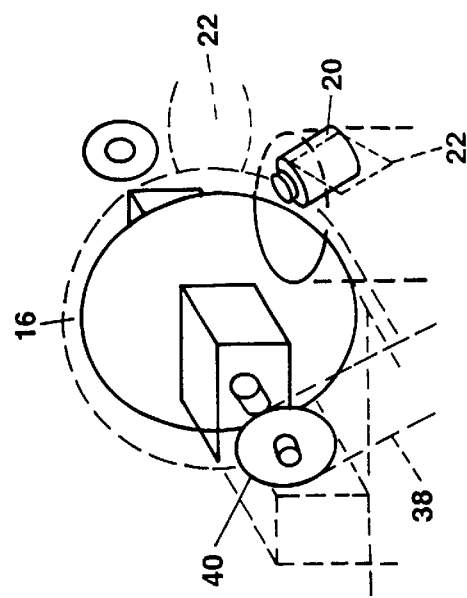
FIG. 5 is a perspective view of a portion of the vehicle illustrated in FIG. 4.

As further illustrated in FIG. 5 the momentum of flywheel 16 may be used to supply additional power to rear wheels 32 and 34 by for example, a chain or, belt 38, or drive gears not shown engaged by a clutch 40 shown schematically in FIG. 1.

The operation of the vehicle may now be considered. At the beginning of a trip cycle, the electrical storage cell bank is sufficiently charged by connection to a stationary power source, i.e., regular household electric lines. As the vehicle moves, power is withdrawn from the cell bank which may be replenished at anytime either automatically or on command from the operator by activating the fuel combustor to rotate the flywheel and generator.

If the trip involves starts and stops, some of the momentum of the stopping vehicle will be captured and transferred to the flywheel to again produce recharging of the cell bank. Finally, if conditions require and the flywheel has sufficient momentum, the rotation of the flywheel may be transferred to provide a power boost for the vehicle wheels or at the option of the operator, the fuel combustor may be activated to provide the same power boost through increased rotation of the flywheel.

As alternative arrangements of the various components forming the novel combination of the invention will now be obvious to those skilled in the art, the invention is accordingly defined by the following clause.

What is claimed is:

1. In an electrically operated wheeled vehicle having an electric traction motor powered by an electrical energy storage cell bank, driving at least one vehicle wheel, a powered regeneration system comprising in combination:

a. a rotatably mounted flywheel;

b. an impeller operatively connected to said flywheel;

c. a fuel combustor arranged to emit a stream of combustion gas directed to impinge on said impeller to rotate said flywheel;

d. a supply of fuel for said combustor;

e. an electrical generator operationally connected to said flywheel to produce electrical power upon the rotation of said flywheel; and f. electrical power control means connected between said generator and said cell bank to recharge said bank upon the operation of said generator.

2. The apparatus of claim 1 wherein said electrical power control means comprises an electrical storage capacitor network and/or an AC/DC converter.

3. The apparatus of claim 1 wherein said fuel comprises hydrogen peroxide and said combustor comprises catalytic fuel ignition apparatus.

4. The apparatus of claim 1 wherein said impeller comprises a plurality of paddle extensions fixed about the circumference of said flywheel in spaced apart relationship.

5. The apparatus of claim 1 further including clutch means operatively connected between said flywheel and said vehicle wheel, said clutch means operable upon braking of said vehicle whereby power is transferred from said vehicle wheel to said flywheel upon braking of said vehicle, said transfer resulting in rotation of said flywheel.

6. The apparatus of claim 1 wherein said vehicle has at least one rear wheel, and said apparatus further includes second clutch means operatively connected between said flywheel and said rear wheel whereby power is transferred from said flywheel to said wheel upon operation of said second clutch means.

* * * * *